United States Patent
Spieker (10) Patent No.: US 10,124,783 B2
(45) Date of Patent: Nov. 13, 2018

(54) BRAKE CIRCUIT LEAK DETECTION AND ISOLATION

(71) Applicant: Autoliv ASP, Inc., Ogden, UT (US)

(72) Inventor: Arnold H. Spieker, Commerce Township, MI (US)

(73) Assignee: VEONEER NISSIN BRAKE SYSTEMS JAPAN CO. LTD., Ueda-Shi, Nagano-Ken (JP)

( * ) Notice: Subject to any disclaimer, the term of this patent is extended or adjusted under 35 U.S.C. 154(b) by 192 days.

(21) Appl. No.: 15/341,574

(22) Filed: Nov. 2, 2016

(65) Prior Publication Data

US 2018/0118183 A1    May 3, 2018

(51) Int. Cl.
*B60T 17/22* (2006.01)
*B60T 13/14* (2006.01)
*B60T 7/04* (2006.01)
*B60T 8/34* (2006.01)
*B60T 8/40* (2006.01)

(52) U.S. Cl.
CPC ............ *B60T 17/221* (2013.01); *B60T 7/042* (2013.01); *B60T 8/34* (2013.01); *B60T 13/142* (2013.01); *B60T 8/4081* (2013.01)

(58) Field of Classification Search
CPC ........ B60T 8/4072; B60T 8/368; B60T 8/441; B60T 8/4031; B60T 8/00; B60T 8/171; B60T 8/172; B60T 8/4013; B60T 17/221
USPC .......................................................... 303/10
See application file for complete search history.

(56) References Cited

U.S. PATENT DOCUMENTS

| | | |
|---|---|---|
| 5,979,997 A | 11/1999 | Ohkubo et al. |
| 6,007,164 A | 12/1999 | Sakai et al. |
| 6,161,904 A | 12/2000 | Schmidt et al. |
| 6,206,489 B1 | 3/2001 | Schmidt et al. |
| 6,231,133 B1 | 5/2001 | Tsukamoto |

(Continued)

FOREIGN PATENT DOCUMENTS

| | | |
|---|---|---|
| DE | 102005004774 A1 | 9/2005 |
| EP | 1442227 A1 | 8/2004 |
| GB | 2403520 A | 1/2005 |

OTHER PUBLICATIONS

International Search Report for PCT/IB2017/058322, ISA/US, Alexandria, dated Apr. 16, 2018.

(Continued)

*Primary Examiner* — Robert A. Siconolfi
*Assistant Examiner* — San M Aung
(74) *Attorney, Agent, or Firm* — Stephen T. Olson; Harness, Dickey & Pierce, P.L.C.

(57) ABSTRACT

A method for detecting the location of and isolating a leak in a braking system by simultaneously controlling a direct apply subsystem (DAS) and an isolated apply subsystem (IAS) to enable fluid communication between the IAS and the first circuit; to block fluid communication of the DAS with the first circuit; to enable fluid communication of the DAS with the second circuit; and to block fluid communication of the IAS with the second circuit. A sensed travel of an isolated apply component and a sensed fluid pressure developed by the IAS may be used to determine if the leak is present in the first circuit, while simultaneously using the sensed travel of a direct apply component of the DAS, and a sensed fluid pressure developed by the DAS, to determine if the leak is present in the second circuit.

20 Claims, 9 Drawing Sheets

(56) References Cited

U.S. PATENT DOCUMENTS

| | | | |
|---|---|---|---|
| 6,430,943 B2 | 8/2002 | Pfister et al. | |
| 6,450,591 B1 | 9/2002 | Kawahata et al. | |
| 7,395,907 B2 | 7/2008 | de Kock et al. | |
| 8,851,579 B2 | 10/2014 | Ohkubo et al. | |
| 8,894,159 B2 | 11/2014 | Nakata et al. | |
| 2002/0050739 A1 | 5/2002 | Koepff et al. | |
| 2004/0041467 A1 | 3/2004 | Giers et al. | |
| 2004/0243290 A1* | 12/2004 | Schmidt | B60T 8/442 701/29.2 |
| 2006/0043790 A1 | 3/2006 | Spieker | |
| 2007/0035179 A1 | 2/2007 | Kling et al. | |
| 2008/0106142 A1 | 5/2008 | Nishino et al. | |
| 2008/0234909 A1 | 9/2008 | Iwasaki et al. | |
| 2012/0126610 A1* | 5/2012 | Nakata | B60T 1/10 303/9.63 |
| 2012/0235469 A1 | 9/2012 | Miyazaki et al. | |
| 2012/0256477 A1 | 10/2012 | Miyazaki et al. | |
| 2012/0283926 A1 | 11/2012 | Ito | |
| 2013/0035835 A1* | 2/2013 | Hachtel | B60T 8/3265 701/70 |
| 2013/0218407 A1 | 8/2013 | Jungbecker et al. | |
| 2013/0241275 A1 | 9/2013 | Miyazaki et al. | |
| 2014/0008965 A1 | 1/2014 | Ito et al. | |
| 2015/0175144 A1 | 6/2015 | Watanabe | |
| 2015/0367828 A1 | 12/2015 | Oosawa et al. | |
| 2016/0059839 A1* | 3/2016 | Nanahara | B60T 17/221 73/39 |

OTHER PUBLICATIONS

Written Opinion of the ISA for PCT/IB2017/058322, ISA/US, Alexandria, dated Apr. 16, 2018.

* cited by examiner

BRAKE CIRCUIT LEAK DETECTION AND ISOLATION

FIELD

The present disclosure relates to brake systems for motor vehicles, and more particularly to a leak detection circuit for a brake system which is able to more quickly detect and identify whether a leak is present in a primary or secondary circuit portion of a brake system, and to isolate the specific circuit portion having the leak.

BACKGROUND

The statements in this section merely provide background information related to the present disclosure and may not constitute prior art.

Leak detection systems for brake systems are generally known. Modern day brake systems typically have a primary circuit and a secondary circuit. For example, such systems may have the front/right brake calipers and the rear/left brake calipers on one circuit, while the front/left and rear/right brake calipers are on the other circuit. If one circuit develops a leak, the calipers of the other circuit will still remain operable. When detecting for leaks, it would be desirable to perform the tests needed in real time while the driver is operating the vehicle, and the necessary action of isolating the leaking circuit needs to be taken as quickly as possible while meeting braking distance requirements without negatively impacting brake performance or the brake pedal travel and "feel" to maintain driver confidence in the brake system.

SUMMARY

In one aspect the present disclosure relates to a method for expeditiously locating and isolating a leak in a braking system for a motor vehicle. The method may comprise selectively using a direct apply subsystem, which is operably associated with a brake pedal of the vehicle, and an isolated apply subsystem, to control an application of fluid to a first circuit and a second circuit. The method may further involve detecting a location of the leak by simultaneously controlling the direct apply subsystem and the isolated apply subsystem to: enable fluid communication between the isolated apply subsystem and the first circuit of the braking system; to block fluid communication of the direct apply subsystem with the first circuit; to enable fluid communication of the direct apply subsystem with the second circuit of the braking system; and to block fluid communication of the isolated apply subsystem with the second circuit. The method may further involve using a sensed travel of an isolated apply component of the isolated subsystem and a sensed fluid pressure developed by the isolated apply subsystem to determine if the leak is present in the first circuit, while simultaneously using the sensed travel of a direct apply component of the direct apply subsystem and a sensed fluid pressure developed by the direct apply subsystem to determine if the leak is present in the second circuit.

In another aspect the present disclosure relates to a method for expeditiously locating and isolating a leak in a braking system for a motor vehicle. The method may comprise selectively using a direct apply subsystem, which this operably associated with a brake pedal of the vehicle, and an isolated apply subsystem, to control an application of fluid to a first circuit and to a second circuit of the braking system. The method may further comprise operating the braking system in a normal mode of operation in which fluid communication of the isolated apply portion with the first circuit and the second circuit is enabled, and fluid communication of the direct apply portion with the first circuit and the second circuit is blocked. The method may further involve using a sensed travel of an isolated apply component of the isolated apply subsystem, and a sensed fluid pressure developed by the isolated apply subsystem, in response to a travel/pressure relationship, to determine if a leak is present in at least one of the first or second circuits. If the sensed fluid pressure developed by the isolated apply portion is less than a predetermined value corresponding to the travel/pressure relationship, then the method determines that a leak is present and proceeds to detect the location of the leak. Detecting the location of the leak may be achieved by simultaneously controlling the direct apply subsystem and the isolated apply subsystem to: enable fluid communication between the isolated apply subsystem and the first circuit of the braking system; block fluid communication of the direct apply subsystem with the first circuit; enable fluid communication of the direct apply subsystem with the second circuit of the braking system; and block fluid communication of the isolated apply subsystem with the second circuit; and using a sensed travel of the isolated apply component of the isolated supply subsystem and a sensed fluid pressure developed by the isolated apply subsystem to determine if the leak is present in the first circuit, and simultaneously using a sensed travel of the direct apply component of the direct apply subsystem, and a sensed fluid pressure developed by the direct apply subsystem, to determine if the leak is present in the second circuit. The method may further involve using the determination if a leak is present in at least one of the first or second circuits to at least one of: selectively place the braking system in a first circuit isolation mode when the leak is detected to be in the first braking circuit, in which the first circuit is isolated and braking is accomplished exclusively using the second circuit; and selectively place the braking system in a second circuit isolation mode when the leak is detected to be in the second circuit, in which the second circuit is isolated and braking is accomplished exclusively using the isolated apply subsystem on the first circuit. If the sensed fluid pressure developed by the isolated apply portion is greater than or equal to the predetermined value, then operation in the normal mode is resumed.

In still another aspect the present disclosure relates to a system for expeditiously locating and isolating a leak in a braking system for a motor vehicle. The system may comprise a direct apply subsystem operably associated with a brake pedal of the vehicle, and an isolated apply subsystem adapted to control an application of fluid to a first circuit and a second circuit of the braking system. The isolated and direct apply systems are configured to be simultaneously controlled to detect a location of the leak by: enabling fluid communication between the isolated apply subsystem and the first circuit of the braking system; blocking fluid communication of the direct apply subsystem with the first circuit; enabling fluid communication of the direct apply subsystem with the second circuit of the braking system; and blocking fluid communication of the isolated apply subsystem with the second circuit. The system further operates to use a sensed travel of a component of the isolated apply subsystem and a sensed fluid pressure developed by the isolated apply subsystem to determine if the leak is present in the first circuit, and simultaneously uses a sensed travel of a direct apply component of the direct apply subsystem and a sensed fluid pressure developed by the direct apply subsystem to determine if the leak is present in the second circuit.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Corresponding reference numerals indicate corresponding parts throughout the several views of the drawings.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
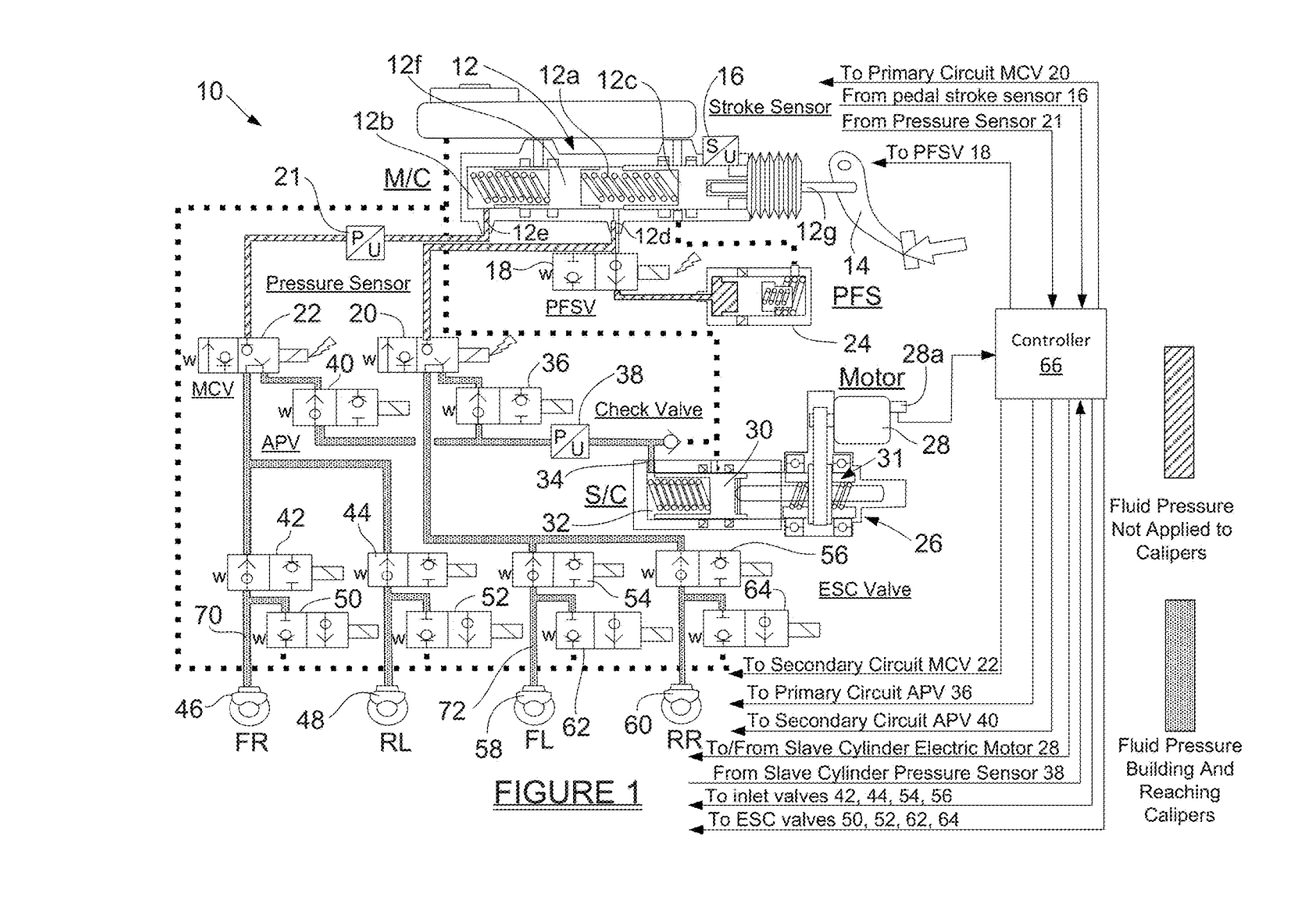
FIG. 1 is a high level schematic diagram of a brake system operating in a normal mode, in accordance with one embodiment of the present disclosure.

Referring to FIG. 1, there is shown a high level schematic diagram of a brake system 10 in accordance with one embodiment of the present disclosure. The brake system 10 includes a master cylinder 12 which receives a mechanical input signal from an input device, for example, a brake pedal 14, where the brake pedal 14 is configured to be operated (i.e., depressed) by an operator of the vehicle. A direct apply component position sensor 16, which in one example may be a stroke sensor (and will be referred to throughout for convenience simply as "stroke sensor 16") is used to sense a stroke (i.e., position) of the brake pedal 14, or of a stroke of an input rod or even a stroke of a piston of the master cylinder 12. The master cylinder 12 includes a primary circuit portion 12a having a primary piston 12c, and a secondary circuit portion 12b having a secondary piston 12f. The primary circuit portion 12a includes a first output port 12d in communication with both a pedal feel simulator valve 18 (hereinafter simply "PFSV 18") as well as a primary circuit master cut valve 20 (MCV). The secondary circuit portion 12b is in communication with a secondary circuit MCV 22 via a second output port 12e. In this example a pressure sensor 21 is coupled in line between the secondary circuit portion 12b of the master cylinder 12 and the secondary circuit MCV 22. However, it will be appreciated that the pressure sensor 21 could be in line with the primary circuit portion 12a, or there could be a sensor on each of the primary and secondary circuit portions 12a and 12b. The precise configuration and number of sensors used will depend in part on exactly how the leak detection is to be implemented. The PFSV 18 is in communication with a pedal feel simulator component 24, which is in turn in communication with the primary circuit portion 12a of the master cylinder 12.

Referring further to FIG. 1, the brake system 10 further includes a slave cylinder 26 having a motor 28. The slave cylinder motor 28 controls linear movement of a piston 30 via a ball screw assembly 31, which in turn forces brake fluid out from a fluid chamber 32, through an outlet port 34 to a port of a primary circuit apply valve 36 (APV). It will be appreciated that with this implementation that makes use of the motor 28, an isolated apply component position sensor 28a is used for monitoring a position (i.e., travel) of an isolated apply component. The isolated apply component position sensor 28a, in one example, may be an encoder which is used to monitor the rotational position of the motor 28 for use in determining the control of final pressure, motor control and slave cylinder 26 piston travel for leak detection. For convenience, the isolated apply position sensor 28a will be referred throughout the following discussion simply as the "encoder 28a". It should also be noted that alternative methods for measuring/monitoring the slave cylinder piston travel can also be used, as well as alternative structures for forcing brake fluid in isolation from the master cylinder 12 along with corresponding methods of measuring/monitoring travel of components forcing the brake fluid. For example, the encoder 28a could be used on the motor 28 or on the ball screw assembly 31, or any other suitable sensing element may be used that is able to sense movement of components forcing the brake fluid such as the slave cylinder piston 30.

The primary circuit APV 36 is also coupled for communication with a port of the primary circuit MCV 20. A pressure sensor 38 is coupled in a fluid line coupling the slave cylinder outlet port 34 with the primary circuit APV 36. The outlet port 34 of the slave cylinder 26 is also coupled to a port of a secondary circuit APV 40. The primary circuit MCV 20 and the primary circuit APV 36 essentially form a first valve subsystem associated with the primary circuit. The secondary circuit MCV 22 and the secondary circuit APV 40 essentially form a second valve subsystem associated with the secondary circuit.

Referring further to FIG. 1, a port of the secondary circuit MCV 22 is in communication with secondary circuit inlet valves 42 and 44. Secondary circuit inlet valves 42 and 44 are in communication with a front/right (FR) brake caliper 46 and a rear/left (RL) brake caliper 48, respectively. The secondary circuit inlet valves 42 and 44 are also in communication with secondary circuit electronic stability control valves 50 and 52 (ESC valves), respectively. The primary circuit MCV 20 is in communication with primary circuit inlet valves 54 and 56. Primary circuit inlet valves 54 and 56 are in communication with the front/left (FL) brake caliper 58 and the rear/right (RR) brake caliper 60, respectively. The primary circuit inlet valves 54 and 56 are also in communication with primary circuit ESC valves 62 and 64, respectively. The primary circuit portion 12a of the master cylinder 12, the primary circuit MCV 20, the primary circuit APV 36, the slave cylinder 26, pressure sensor 38, primary circuit inlet valves 54 and 56, primary circuit ESC valves 62 and 64, and brake calipers 58 and 60 are included within the primary circuit of the brake system 10. The secondary circuit portion 12b of the master cylinder 12, the secondary circuit MCV 22, the secondary circuit APV 40, the pressure sensor 21, the secondary circuit inlet valves 42 and 44, the secondary ESC valves 50 and 52, and the FR and RL brake calipers 46 and 48, are included within the secondary circuit.

It will be appreciated that a portion of the brake system 10 forms a "direct apply" subsystem, and a portion forms an "isolated apply" subsystem." The isolated apply subsystem may be formed by the slave cylinder 26 having the slave cylinder motor 28 and a ball screw assembly 31. The ball screw assembly 31 drives the piston 30, which may be viewed as an "isolated apply component". The isolated apply subsystem may have a single output in communication with the primary circuit APV 36 and the secondary circuit APV 40. The direct apply subsystem may include the dual output master cylinder 12, which is mechanically coupled to and actuated by the brake pedal 14, and builds fluid pressure in at least one of the PFS 24, the primary circuit, and the secondary circuit in direct relation to actuation of the brake pedal. A piston 12c and/or a piston 12f, and/or the input rod 12g, and/or the brake pedal 14, may be viewed as a "direct apply component". A first output 12d of the direct apply subsystem (i.e., master cylinder 12) may be in communication with the PFSV 18 and the primary circuit MCV 20. A second output 12e of the master cylinder 12 may be in communication with the secondary circuit MCV 22. It will also be appreciated that the isolated supply system could be formed by any assembly, such as using a motor driven pump with an accumulator and a spool valve, that can provide boosted fluid pressure through a single outlet 34 to one or both of the primary circuit and the secondary circuit responsive to a sensed stroke of the brake pedal 14 while being mechanically isolated from the brake pedal.

With further reference to FIG. 1, a processor-based controller 66 is shown in highly simplified form. The controller 66 receives signals from the pressure sensors 21 and 38, and from the stroke sensor 16. The controller 66 generates signals for controlling the PFSV 18, the slave cylinder motor 28 and the various valves 20, 22, 36, 40, 42, 44, 50, 52, 54, 56, 62 and 64.

Figure 2:
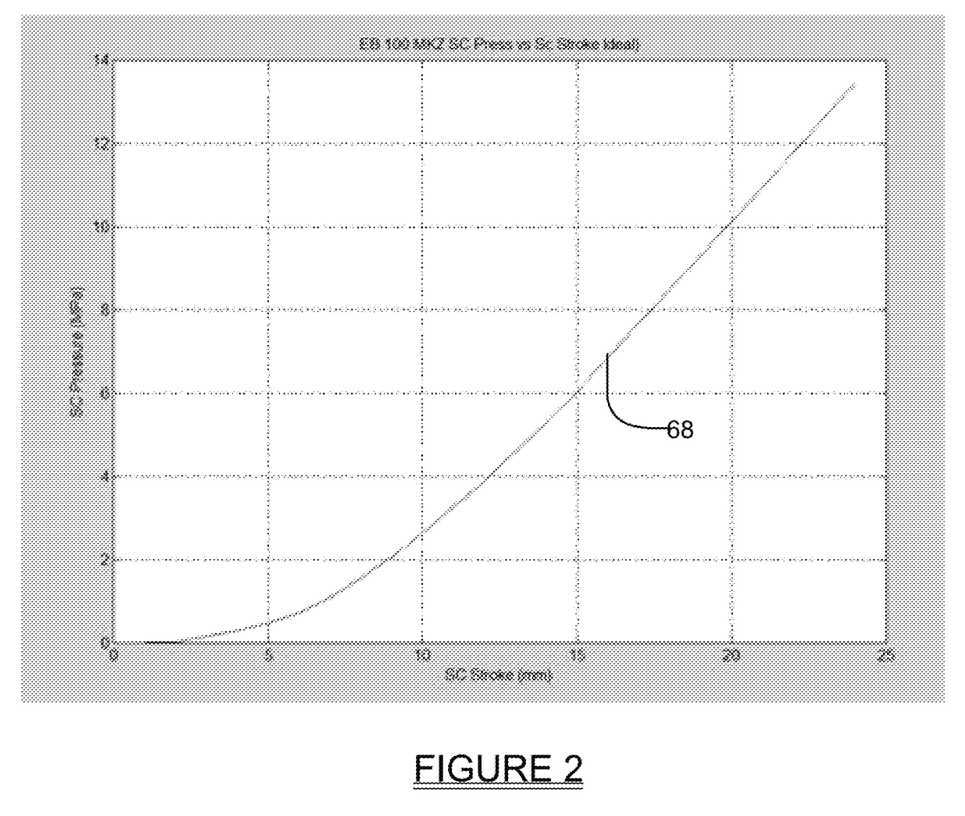
FIG. 2 is graph showing slave cylinder pressure vs. slave cylinder stroke curve, and the resulting performance curve, which represents a normal operation of the system, and which the system uses to initially detect that a fluid leak has developed somewhere in the system.

With brief reference to FIG. 2, it will also be appreciated that the brake calipers 46, 48, 58 and 60 each have compliance, and they flex when pressure is applied. This compliance is relatively consistent and therefore a relationship between the pressure in a brake system and the volume of fluid in the calipers 46, 48, 58 and 60 can be defined. Additionally, since the slave cylinder 26 has a fixed diameter, this relationship can be translated to slave cylinder pressure vs. slave cylinder piston travel, as illustrated by performance curve 68 in FIG. 2. The performance curve 68 thus represents an "ideal" slave cylinder ("SC") pressure vs. SC piston position or stroke. The performance curve 68 may be for just one of the calipers 46/48/58/60, for all four of the calipers, or for any other combination of the calipers. The controller 66 uses the performance curve 68 to identify a potential leak affecting any of the calipers 46/48/58/60 by monitoring and comparing the slave cylinder 26 pressure to the slave cylinder position, and when an error is exceeded, a potential leak is flagged.

Figure 7:
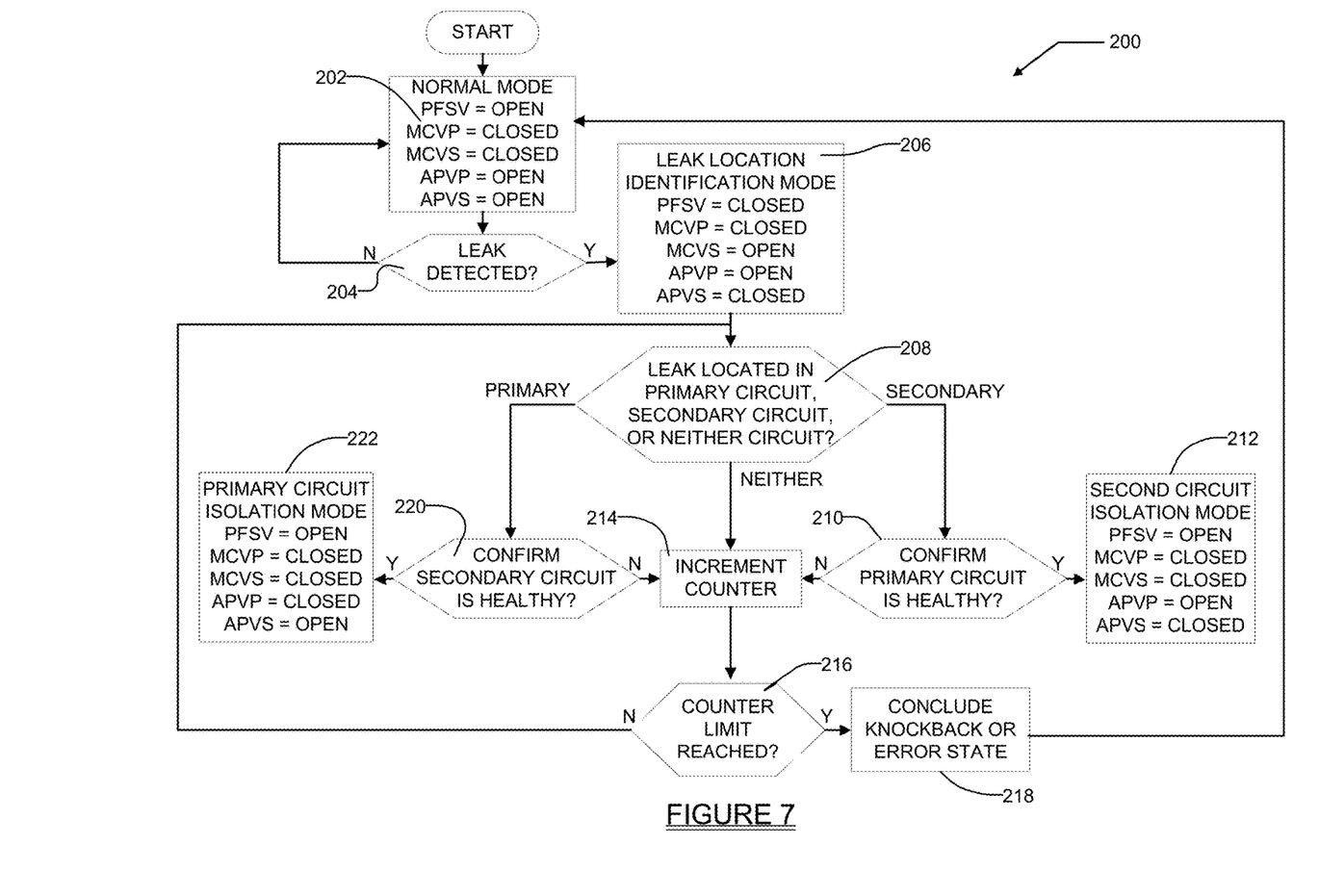
FIG. 7 is a high level flowchart of various operations that the system performs in detecting a location of a leak and isolating a leaking circuit in the system.

FIG. 7 is a flow chart 200 that illustrates a general sequence of operations that the brake system 10 performs in locating and isolating a leak in one of the brake circuits. Initially, however, before any leak is located and isolated, operation 202 identifies a "normal" mode operation, which uses the valve configurations shown in FIG. 7. In the normal mode, the PFSV 18 is open, the secondary circuit MCV 22 is closed, and the primary circuit MCV 20 is closed. With this valve configuration, the master cylinder 12 is only in fluid communication with the PFS 24, which provides the driver with the desired feel during operation of the brake pedal 14, without directly applying fluid pressure to the calipers 46, 48, 58, 60 from the master cylinder 12. In other words, the direct apply subsystem is blocked from fluidly communicating with the primary circuit and the secondary circuit. Additionally, the primary circuit APV 36 and the secondary circuit APV 40 are open so that the slave cylinder 26 provides boosted fluid pressure in accordance with a command signal determined based on the position of the direct apply component and/or the pressure measured at pressure sensor 21, to the calipers 46, 48, 58, 60. In other words, the fluid communication of the isolated apply subsystem with the primary circuit and the secondary circuit is enabled.

While the brake pedal 14 is depressed by the driver, the stroke sensor 16 detects the amount of stroke of the brake pedal 14 and sends information about the amount of stroke to the controller 66, which will determine the desired braking force. The controller 66 controls the slave cylinder motor 28 to provide fluid pressure based on the desired braking force. In step 204, the controller 66 reads the position of the motor 28 from the motor position sensor, such as encoder 28a, and calculates an effective slave cylinder stroke and the pressure from the outlet port 34 of the slave cylinder 26 from the pressure sensor 38, and then compares the stroke and pressure to a corresponding pressure v. stroke performance curve. If the sensed pressure is substantially equal to the predetermined pressure based on the stroke on the pressure v. stroke performance curve (N at step 204), the controller 66 determines there is no leak and maintains the brake system 10 operating in the normal mode (i.e., control goes back to step 202) described above. Otherwise, if the sensed pressure is below the predetermined pressure (Y at step 204), likely caused by a leak in the primary circuit or the secondary circuit, the controller 66 determines a leak is present and changes operation of the brake system 10 to a leak location identification mode at step 206.

In the leak location detection mode, the PFSV 18 is closed (de-energized), the secondary circuit MCV 22 is opened (de-energized), the primary circuit MCV 20 remains closed (energized), and APV 40 is closed (energized). With this valve configuration, the master cylinder 12 is in fluid communication with the secondary circuit, directly applying fluid pressure to the front/right (FR) caliper 46 and the rear/left (RL) caliper 48. Additionally, since the primary circuit APV 36 is open, and the secondary circuit APV 40 is closed, the slave cylinder 26 is in fluid communication only with the primary circuit to provide fluid pressure in accordance with a stroke slave cylinder to the front/left (FL) caliper 58 and the rear/right (RR) caliper 60. In other words, while in the leak location detection mode, the primary circuit is controlled by the isolated apply subsystem, while the secondary circuit is simultaneously controlled by the direct apply subsystem. At operation 208, the system 10 determines if the leak is present in the primary circuit or the secondary circuit, and then enters the appropriate isolation mode, as indicated at steps 210 and 212. Additional detail concerning the isolation modes will be provided in the following paragraphs.

Figure 3:
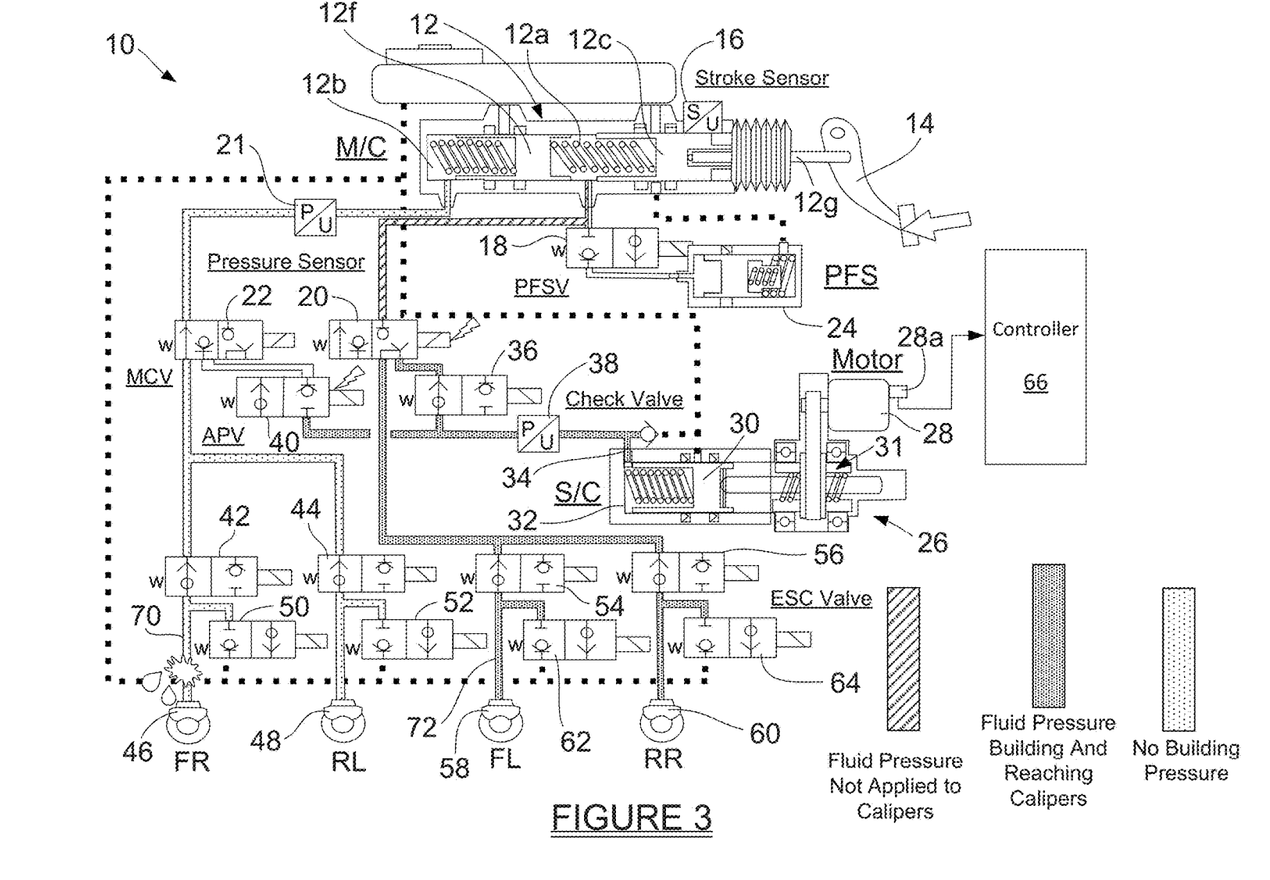
FIG. 3 is an illustration of the brake system of FIG. 1 but operating in a leak location detection mode to detect a leak present in a portion of the secondary circuit, with heavy stippling to indicate where fluid pressure is building in the system, and light stippling to indicate where fluid pressure is not building.
Figure 4:
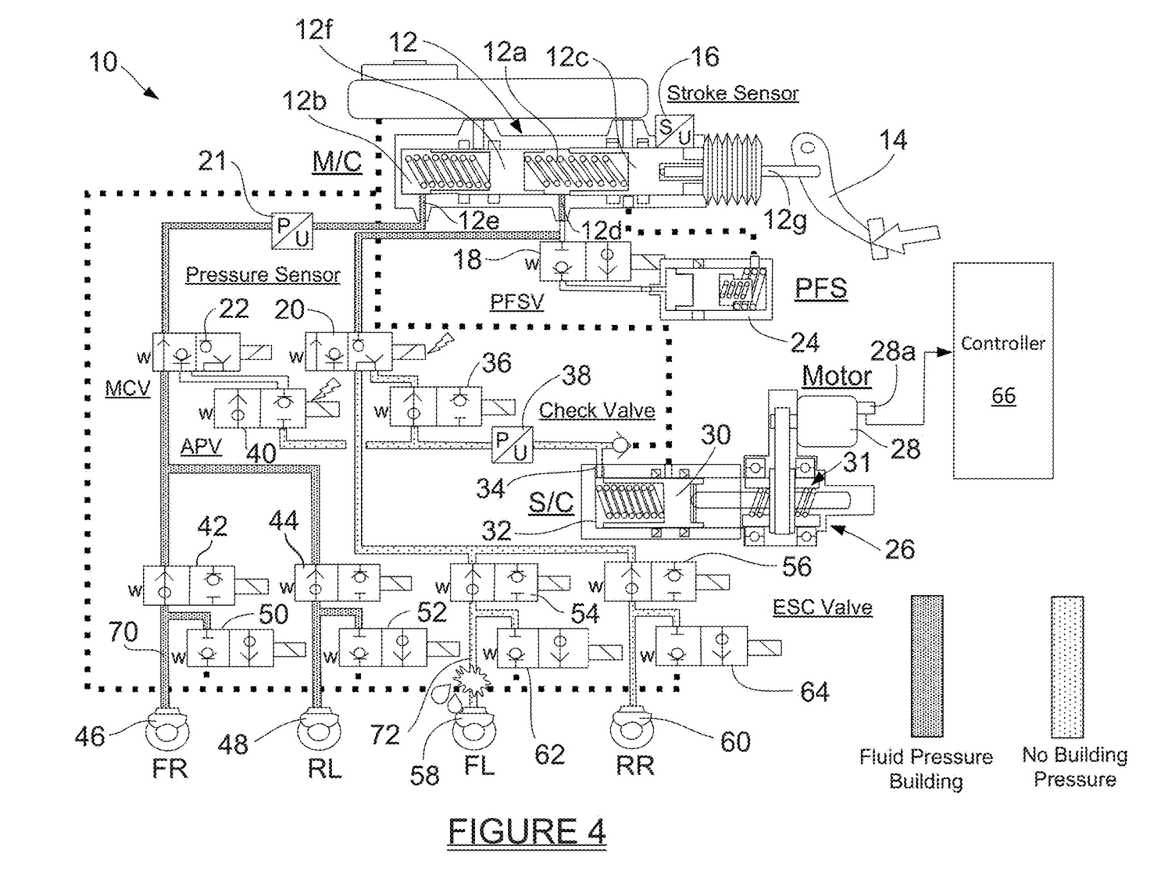
FIG. 4 is an illustration of the brake system of FIG. 1 but operating in a leak location detection mode to detect a leak present in a portion of the primary circuit of the system, and with heavy stippling illustrating where fluid pressure is building in the system, and light stippling illustrating where no fluid pressure is building.

Referring to FIGS. 3 and 4, a description will now be provided as to how the brake system 10 operates in the leak location detection mode by controlling the various valves, and using information available from the stroke sensor 16, the master cylinder pressure sensor 21, the isolated apply component position sensor (encoder 28*a*) and the slave cylinder pressure sensor 38 to identify whether the leak is in the primary circuit or the secondary circuit of the brake system 10. In the example shown in FIG. 3, it will be noted that a leak is indicated within the secondary circuit in fluid line 70 associated with the FR brake caliper 46, and would function similarly if the leak was located in association with the RL caliper 48. In the example shown in FIG. 4, it will be noted that a leak is indicated within the primary circuit in fluid line 72 associated with FL brake caliper 58 and would function similarly if the leak was located in association with the RR caliper 48.

In FIG. 3, the secondary circuit MCV 22 is open (de-energized) to the master cylinder 12, the PFSV 18 is closed (de-energized), and the secondary circuit APV 40 is closed (energized), to open the flow path from the master cylinder 12 to the FR and RL brake calipers 46 and 48 on the secondary circuit, which is where the leak is located in this example. The primary circuit MCV 20 remains closed (energized) to the master cylinder 12, and the primary circuit APV 36 remains open (de-energized) to keep open the flow path from the slave cylinder 26 to the FL and RR brake calipers 58 and 60 on the primary circuit. The above actions simultaneously and independently sends fluid from the master cylinder 12 directly from operation of the brake pedal 14 to the secondary circuit, and from the slave cylinder 26 to the primary circuit in isolation from the brake pedal based on the sensed stroke from the stroke sensor 16.

With the secondary circuit leak condition indicated in fluid line 70 in FIG. 3, pressure will build in the primary circuit and be detected by the slave cylinder pressure sensor 38, which will be determined by the controller 66 to correspond to the predetermined pressure from a pressure v. stroke performance curve. The controller 66 will then determine the leak is not in the primary circuit, thus considering the primary circuit to be healthy. The fluid lines of the brake system 10 experiencing an increasing pressure are denoted by lines having heavy stippling. The slave cylinder piston 30 position will stabilize to a predictable pressure/stroke relationship. However, because of the leak in fluid line 70, the pressure will not build in the secondary circuit. This condition is indicated by lines having light stippling, which will be detected by the master cylinder pressure sensor 21, and will be determined by the controller 66 to be below the predetermined pressure from the pressure v. stroke performance curve. Accordingly, the controller 66 will then determine the leak is located in the secondary circuit, thus considering the secondary circuit to be the leaking circuit. Brake pedal 14 travel will increase, and brake pedal travel will be measured by the pedal stroke sensor 16. The PFS component 24 will empty into the primary circuit portion 12*a* of the master cylinder 12, and this action may have an influence on the brake pedal 14 travel. The vehicle making use of the brake system 10 will decelerate based on the pressure built up in the primary circuit which is actuating the FL caliper 58 and the RR caliper 60 while simultaneously detecting the location of the leak to be in the secondary circuit. The controller 66 can then take the needed action to control the secondary circuit MCV 22 to isolate the secondary circuit and close off fluid flow to the FR and RL calipers 46 and 48 through the secondary circuit.

It is one significant advantage of the brake system 10 and method of the present disclosure that sensing is occurring simultaneously for the primary circuit and the secondary circuit. The simultaneous, real-time testing of the primary and secondary circuits works to detect a leak located in either circuit. This enables especially quick, real-time identification of where the leak is located (i.e., secondary or primary circuit) so that the appropriate action can be taken to isolate the leaking circuit and minimize fluid loss. In this manner, vehicle braking deceleration is restored quickly, excessive brake pedal 14 travel is limited and a normal brake pedal "feel" is restored much more quickly than with prior developed brake leak detection/management systems.

FIG. 4 illustrates the brake system 10 of FIG. 1 but with the leak present in fluid line 72 communicating with the FL brake caliper 58. In this example, identical control parameters are used: that is, the secondary circuit MCV 22 is open (de-energized) to the master cylinder 12, the PFSV 18 is closed (de-energized), and the secondary circuit APV 40 is closed (energized) to open the flow path from the master cylinder 12 to the FR and RL brake calipers 46 and 48 on the secondary circuit; and the primary circuit MCV 20 remains closed (energized) to the master cylinder 12, and the primary circuit APV 36 remains open (de-energized) to keep open the flow path from the slave cylinder 26 to the FL and RR brake calipers 58 and 60 on the primary circuit, which is where the leak is located in this example. However, because no leak is present in the secondary circuit, pressure will build in the fluid lines of the secondary circuit, as indicated by the heavy stippling, which will be determined by the controller 66 to correspond to the predetermined pressure from the pressure v. stroke performance curve. The controller 66 will then determine the leak is not in the secondary circuit, thus considering the secondary circuit to be healthy. Since the leak is present in fluid line 72 within the primary circuit, pressure will not build in the fluid lines of the primary circuit, as indicated by light stippling on the various primary circuit fluid lines, and will be determined by the controller 66 to be below the predetermined pressure from the pressure v. stroke performance curve. Accordingly, the controller 66 will then determine the leak is located in the primary circuit, thus considering the primary circuit to be the leaking circuit.

A third group of conditions exist when a potential leak condition is identified. These conditions are severe knock-back, air infiltration into the braking system or brake fluid boiling. In these conditions several actions occur. Secondary circuit pressure will build and, eventually, will be sensed by the master cylinder pressure sensor 21. The controller 66 uses this sensed pressure from the pressure sensor 21 to determine pressure. Brake pedal 14 travel will increase to a level based upon the severity of the air infiltration or other condition, and then follow the slave cylinder pressure v. stroke relationship pressure (measurable with the input stroke sensor 16). The PFS 24 will partially empty, and this action may have an influence on brake pedal 14 travel. The primary circuit pressure will build, eventually, and may be measured by the controller 66 using the signal from the master cylinder pressure sensor 21. The slave cylinder piston 30 position will continue to increase until pressure builds and then will follow the slave cylinder pressure v. stroke relationship curve 68. Vehicle deceleration will build in a manner similar to as if this condition were to occur in a standard vacuum boosted brake system. The response would be to end the testing routine and continue with normal braking.

Figure 5:
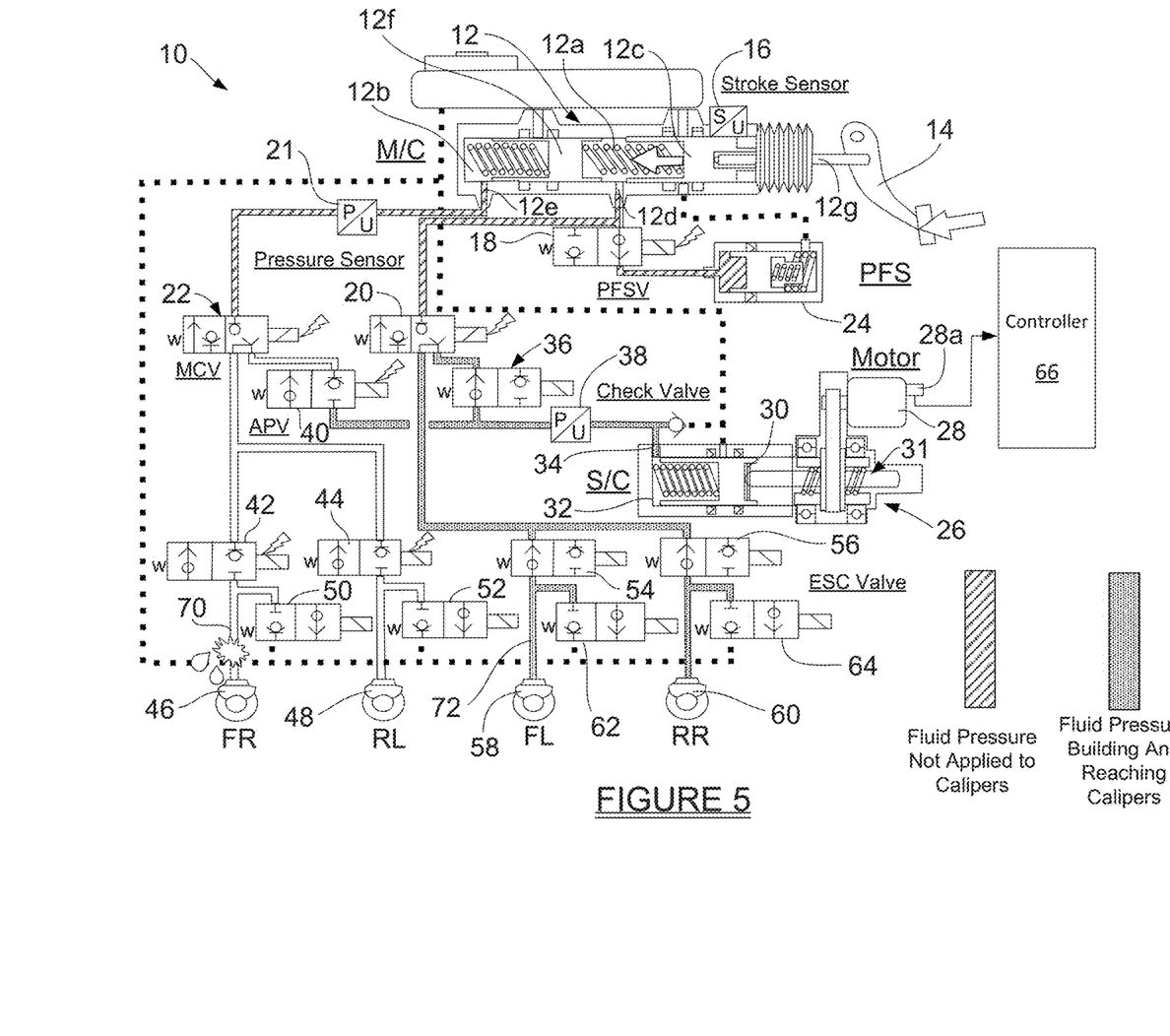
FIG. 5 is an illustration of the brake system of FIG. 3 showing but operating in a secondary circuit isolation mode.
Figure 6:
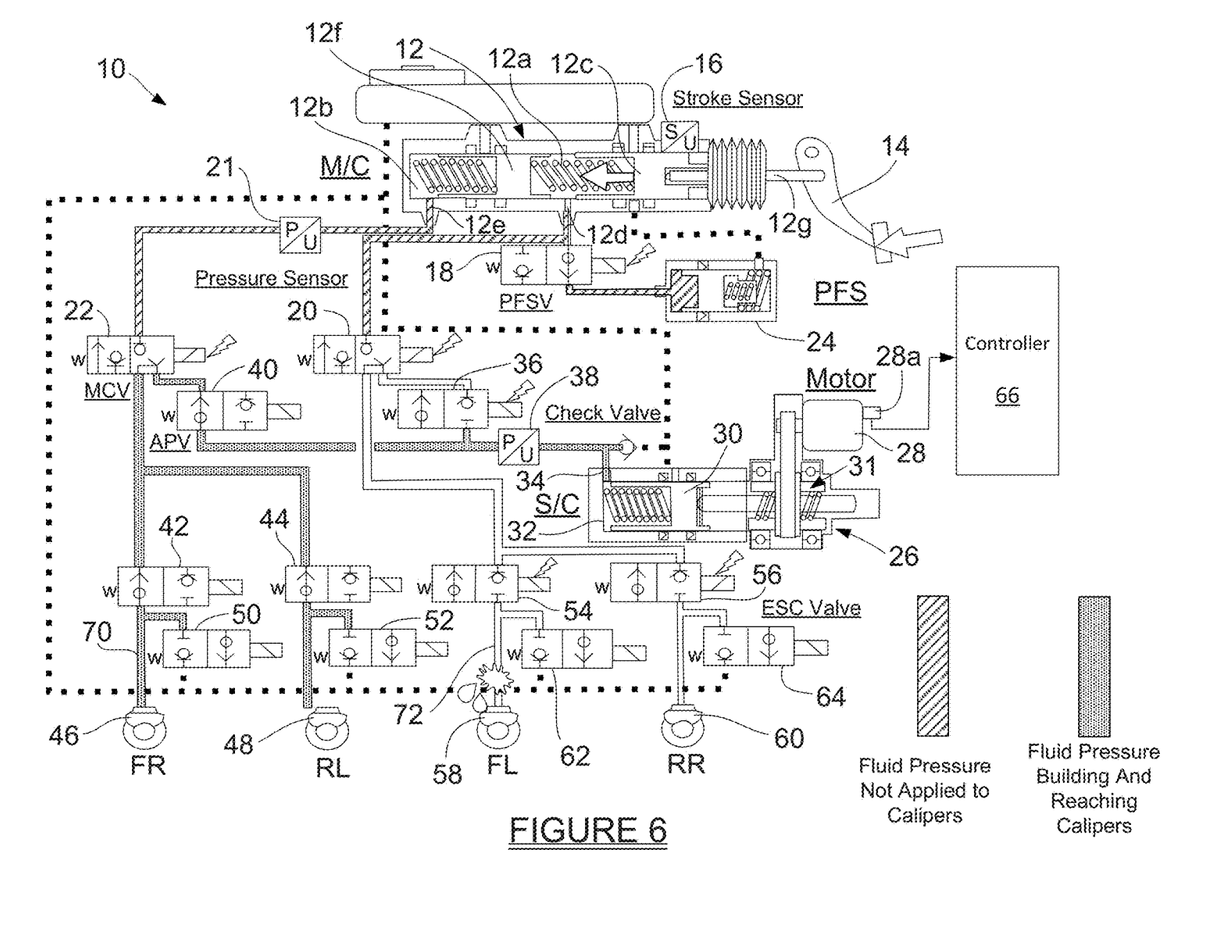
FIG. 6 is an illustration of the brake system of FIG. 4 but operating in a primary circuit isolation mode.

With continuing reference to FIGS. 5 and 7, if, in step 208 (FIG. 7), the controller 66 determines the secondary circuit to be the leaking circuit, the brake system 10 then proceeds to step 210 in which it makes an attempt to confirm that the primary circuit is healthy. If the pressure continues to build in the primary circuit and is determined by the controller 66 to correspond to the predetermined pressure from a pressure v. stroke performance curve, the controller 66 will then determine the leak is not in the primary circuit, thus considering the primary circuit to be healthy (Y at step 210), and the controller will place the braking system in the secondary circuit isolation mode in step 212. To isolate the leaking fluid line 70 in the secondary circuit, the secondary circuit APV 40 remains closed (energized), and the secondary circuit MCV 22 becomes closed (energized) to the master cylinder 12. Energization of the secondary circuit MCV 22 and the secondary circuit APV 40 interrupts the flow path of fluid through the secondary circuit MCV 22 to the secondary circuit inlet valves 42 and 44, which blocks fluid from both of the master cylinder 12 and the slave cylinder 26 from flowing to the FR caliper 46 and RL caliper 48 of the secondary circuit. The secondary circuit inlet valves 42 and 44 may also be closed (energized), which further interrupts the flow paths through the secondary circuit inlet valves 42 and 44 to the FR caliper 46 and RL brake caliper 48. The PFSV 18 is also opened (energized) which allows flow from the primary circuit portion 12a of the master cylinder 12 into the PFS component 24 to restore the pedal feel simulation during brake pedal 14 operation. The primary circuit MCV 20 remains closed (energized), and the primary circuit APV remains open (de-energized), to maintain fluid flow from the slave cylinder 26 to the primary circuit. Slave cylinder 26 pressure will then build rapidly in the primary circuit. If the check at operation 210 does not confirm the health of the primary circuit (N at step 210), a counter is incremented at operation 214, and a check is made if a predetermined limit for the counter has been reached, as indicated at operation 216. If the check at operation 216 results in a "Yes" answer, then the system 10 concludes that a knockback or error state exists, as indicated at operation 218, and the normal mode is re-entered at operation 202. If the check at operation 216 produces a "No" answer, then operation 208 is re-performed.

If, in step 208 of FIG. 7, the controller 66 determines the primary circuit to be the leaking circuit, the brake system 10 then proceeds to step 220 in which it makes an attempt to confirm that the secondary circuit is healthy. If the pressure continues to build in the secondary circuit and is determined by the controller 66 to correspond to the predetermined pressure from a pressure v. stroke performance curve, the controller 66 will then determine the leak is not in the secondary circuit, thus considering the secondary circuit to be healthy (Y at step 220), and the controller will place the braking system in the primary circuit isolation mode in step 222. To isolate the leaking fluid line 72 in the primary circuit, the primary circuit MCV 20 remains closed (energized) to the master cylinder 12, and the primary circuit APV 36 is closed (energized). Energization of the primary circuit MCV 20 and the primary circuit APV 36 interrupts the flow path of fluid through the primary circuit MCV 20 to the primary circuit inlet valves 54 and 56, which blocks fluid from both of the master cylinder 12 and the slave cylinder 26 from flowing to the FL caliper 58 and RR caliper 60 of the primary circuit. The primary circuit inlet valves 54 and 56 may also be closed (energized), which further interrupts the flow paths through the primary circuit inlet valves 54 and 56 to FL caliper 58 and RR caliper 60. The PFSV 18 is also open (energized), which allows flow from the primary circuit portion 12a of the master cylinder 12 into the PFS component 24 to restore the pedal feel simulation during brake pedal 14 operation. The secondary circuit MCV 22 becomes closed (energized) to the master cylinder 12, and the secondary circuit APV 40 becomes open (de-energized), to block fluid flow from the master cylinder 12 through the secondary circuit MCV 22, and provide fluid flow from the slave cylinder 26 to the secondary circuit. Fluid will then flow through the secondary circuit APV 40, through the secondary circuit MCV 22, and through the secondary circuit inlet valves 42 and 44. This allows pressure to build rapidly in the secondary circuit. If the check at operation 220 does not confirm the health of the primary circuit (N at step 220), a counter is incremented at operation 214, and a check is made if a predetermined limit for the counter has been reached, as indicated at operation 216. If the check at operation 216 results in a "Yes" answer, then the system 10 concludes that a knockback or error state exists, as indicated at operation 218, and the normal mode is re-entered at operation 202. If the check at operation 216 produces a "No" answer, then operation 208 is re-performed.

As shown, when the primary circuit MCV 20 is "open," fluid communication of the primary circuit with the direct apply subsystem is allowed, and communication of the primary circuit with the isolated apply subsystem via primary circuit APV 36 is blocked. Conversely, when the primary circuit MCV 20 is "closed," fluid communication of the primary circuit with the direct apply subsystem is blocked, and communication of the primary circuit with the isolated apply subsystem via the primary circuit APV 36 is allowed. Additionally, the primary circuit becomes isolated, meaning no fluid can be communicated to either of the front/left (FL) caliper 58 and the rear/right (RR) caliper 60, when both of the primary circuit MCV 20 and the primary circuit APV 36 are closed. Similarly, when the secondary circuit MCV 22 is "open," fluid communication of the secondary circuit with the direct apply subsystem is allowed, and communication of the secondary circuit with the isolated apply subsystem via primary circuit APV 36 is blocked. When the secondary circuit MCV 22 is "closed," fluid communication of the secondary circuit with the direct apply subsystem is blocked, and communication of the secondary circuit with the isolated apply subsystem via the secondary circuit APV 40 is allowed. The secondary circuit also becomes isolated, meaning no fluid is communicated to either of the front/right (FR) caliper 46 and the rear/left (RL) caliper 48, when both of the secondary circuit MCV 22 and the secondary circuit APV 40 are closed.

With further reference to FIG. 7, if the initial leak detection at operation 208 indicates that neither one of the primary or secondary circuits is experiencing a leak, then the counter is incremented at operation 214 and a check made if the counter limit has been reached at operation 216. If not, then operation 208 is re-performed. If the counter limit has been reached, then the system 10 concludes that a knockback or error state exists, as indicated at operation 218, and the normal mode of operation is re-entered.

Figure 8:
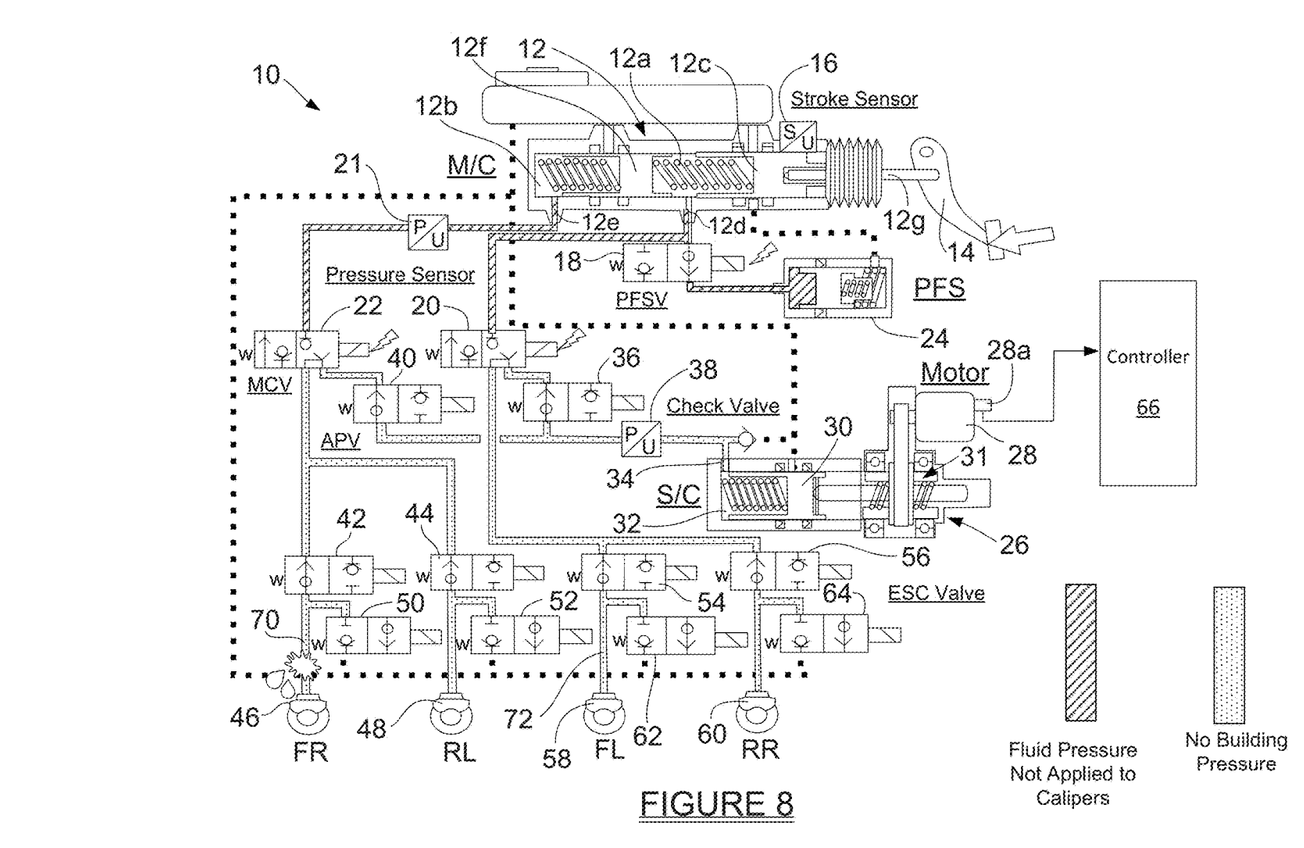
FIG. 8 is an illustration of the brake system of FIG. 1 but with the system in a "normal" mode of operation, and wherein a leak has developed in the secondary circuit.
Figure 9:
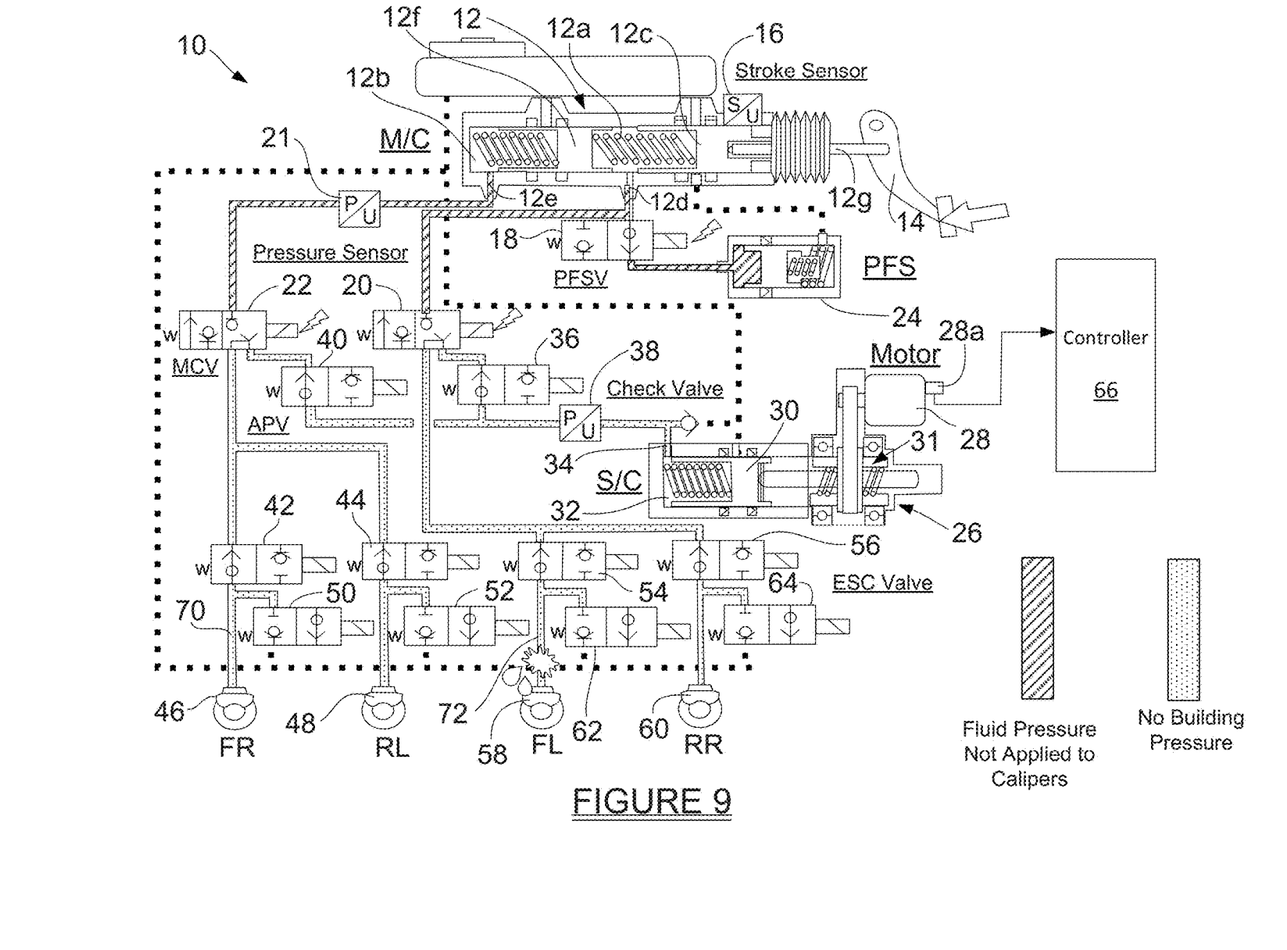
FIG. 9 is an illustration of the brake system of FIG. 1 in the normal mode of operation, but wherein a leak has developed in the primary circuit.

FIGS. 8 and 9 illustrates a "normal" mode of operation when a leak first develops in either the secondary circuit (FIG. 8) or the primary circuit (FIG. 9). In either instance, the master cylinder 12 builds pressure on the MCVs 20, 22 from operation of pedal 14 being pressed, but this pressure is not passed through to the calipers 46, 48, 58, 60. The PFS component 24 is energized to an "open" position, and the master cylinder 12 builds pressure into the PFS component 24. The APVs 36, 40 are both de-energized to the "open" condition. The MCVs 20, 22 are both energized to the "close" position to block fluid flow therethrough from the master cylinder 12, but to allow pressurized fluid from the slave cylinder 26 through the APVs 36, 40 to flow therethrough to the calipers 46, 48, 58, 60. However, the leak in fluid line 70 does not allow for the build of pressure in the isolated apply system.

The brake system 10 thus provides a means for quickly identifying, in real time, whether a leak is present anywhere in a braking system, and then controlling the various components of the braking system to isolate the circuit having the leak. Importantly, the brake system 10 enables the detection of leak in both the primary and secondary circuits to be performed simultaneously in real-time. This allows more rapid detection and isolation of the circuit where the leak is present and allows fluid pressure to be more rapidly built up in the remaining healthy circuit. The brake system 10 does not require the use of additional components beyond what are normally present in a braking system, nor does it otherwise interfere with normal operation of a braking system or significantly increase its complexity or cost.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for determining a location of and isolating a leak in a braking system for a motor vehicle, the method comprising:

selectively using a direct apply subsystem, which is operably associated with a brake pedal of the vehicle, and an isolated apply subsystem, to control an application of fluid to a first circuit and a second circuit;

operating in a leak location detection mode to detect a location of the leak by simultaneously controlling the direct apply subsystem and the isolated apply subsystem to:

enable fluid communication between the isolated apply subsystem and the first circuit of the braking system;

blocking fluid communication of the direct apply subsystem with the first circuit;

enable fluid communication of the direct apply subsystem with the second circuit of the braking system;

block fluid communication of the isolated apply subsystem with the second circuit; and using an input signal associated with a sensed travel of an isolated apply component of the isolated apply subsystem, and a sensed fluid pressure developed by the isolated apply subsystem to determine if the leak is present in the first circuit, and simultaneously using the sensed travel of the direct apply component and a sensed fluid pressure developed by the direct apply subsystem to determine if the leak is present in the second circuit.

2. The method of claim 1, further comprising:
upon condition the leak is determined to be located in the first circuit, selectively place the braking system in a first circuit isolation mode, in which the first circuit is isolated and braking is accomplished exclusively using the second circuit; and
upon condition the leak is determined to be located in the second circuit selectively place the braking system in a second circuit isolation mode, in which the second circuit is isolated and braking is accomplished exclusively using the first circuit.

3. The method of claim 1, wherein the determining if the leak is present in at least one of the first or second circuits comprises:
considering the sensed fluid pressure developed by the isolated apply subsystem and the sensed travel of the isolated apply component; and
when the sensed fluid pressure developed by the isolated apply subsystem is less than a predetermined value, based on the sensed travel of the isolated apply component, determining that a leak is present in the first circuit of the braking system.

4. The method of claim 3, further comprising:
upon determining that the leak is present in the first circuit, operating the braking system of the vehicle in a first circuit isolation mode by:
blocking fluid communication of the isolated apply subsystem and the direct apply subsystem with the first circuit of the braking system; and
enabling fluid communication of the isolated apply portion and blocking communication of the direct apply subsystem with the second circuit of the braking system.

5. The method of claim 4, further comprising:
when operating in the first circuit isolation mode:
closing a first master cut valve associated with the first circuit to block fluid communication of the first circuit with the direct apply subsystem;
closing a first apply valve associated with the first circuit to block fluid communication of the first circuit with the isolated apply subsystem;
closing a second master cut valve associated with the second circuit to block fluid communication of the second circuit with the direct apply subsystem; and
opening a second apply valve associated with the second circuit to allow fluid communication of the second circuit with the isolated apply subsystem.

6. The method of claim 3, wherein the determining if the leak is present in at least one of the first or second circuits comprises:
considering the sensed fluid pressure developed by the direct apply subsystem and the sensed travel of the direct apply component, wherein the direct apply component is a brake pedal; and
when the sensed fluid pressure developed by the direct apply subsystem is less than a predetermined value, determining that a leak is present in the second circuit of the braking system.

7. The method of claim 6, further comprising:
upon determining that the leak is present in the second circuit, operating the braking system of the vehicle in a second circuit isolation mode by:
blocking fluid communication of the isolated apply subsystem and the direct apply subsystem with the second circuit of the braking system; and
enabling fluid communication of the isolated apply subsystem and blocking communication of the direct apply subsystem with the first circuit of the braking system.

8. The method of claim 7, further comprising:
when operating in the second circuit isolation mode:
closing a first master cut valve associated with the first circuit to block fluid communication of the first circuit with the direct apply subsystem;
opening a first apply valve associated with the first circuit to allow fluid communication of the first circuit with the isolated apply subsystem;
closing a second master cut valve associated with the second circuit to block fluid communication of the second circuit with the direct apply subsystem; and
closing a second apply valve associated with the second circuit to block fluid communication of the second circuit with the isolated apply subsystem.

9. The method of claim 1, further comprising:
prior to performing operations to detect the location of the leak:
operating in a normal mode in which fluid communication of the isolated apply subsystem with the first circuit and the second circuit is enabled, and fluid communication of the direct apply subsystem with the first circuit and the second circuit is blocked;
using a sensed travel of the isolated apply component and a sensed fluid pressure developed by the isolated apply subsystem in response to a command based on a travel of the direct apply component, to determine if a leak is present in at least one of the first or second circuits, and:
if the sensed fluid pressure developed by the isolated apply subsystem is less than a predetermined value corresponding to the sensed travel of the isolated apply component, determining that a leak is present and proceeding to detect whether the leak is present in the first circuit or the second circuit; and
if the sensed fluid pressure developed by the isolated apply subsystem is greater than or equal to the predetermined value, then continuing operating in the normal mode.

10. The method of claim 9, further comprising:
when in the normal mode of operation:
closing a first master cut valve associated with the first circuit and a second master cut valve associated with the second circuit to block fluid communication of both of the first circuit and the second circuit with the direct apply subsystem; and
opening a first apply valve associated with the first circuit and a second apply valve associated with the second circuit to allow fluid communication of both of the first circuit and the second circuit with the isolated apply subsystem.

11. The method of claim 1, wherein
the direct apply subsystem includes a dual output master cylinder mechanically coupled to and actuated by the brake pedal, with a first output of the dual output master cylinder in fluid communication with a first master cut valve associated with the first circuit, and a second output of the dual output master cylinder in fluid communication with a second master cut valve associated with the second circuit; and the isolated apply subsystem includes at least one of:
- a single output slave cylinder having the isolated apply component, and wherein the single output slave cylinder is mechanically coupled and actuated using a motor and ball screw assembly; and
- a motor driven pump with an accumulator and a spool valve;

the isolated apply component of the isolated apply subsystem being responsive to a sensed stroke of the brake pedal, while being mechanically isolated from the brake pedal, to develop fluid pressure by the isolated apply subsystem, with the output of the isolated apply subsystem being in fluid communication with a first apply valve associated with the first circuit and a second apply valve associated with the second circuit;

wherein the method further includes:
- using a separate master cut valve with each of the first and second circuits to control fluid communication with the direct apply subsystem; and
- using a separate apply valve with each of the first and second circuits to control fluid communication with the isolated apply subsystem.

12. The method of claim 1, wherein operating in the leak detection mode further comprises:
- closing a first master cut valve associated with the first circuit to block fluid communication of the first circuit with the direct apply subsystem;
- opening a first apply valve associated with the first circuit to allow fluid communication of the first circuit with the isolated apply subsystem;
- opening a second master cut valve associated with the second circuit to allow fluid communication of the second circuit with the direct apply subsystem; and
- closing a second apply valve associated with the second circuit to block fluid communication of the second circuit with the isolated apply subsystem.

13. The method of claim 1, wherein the first circuit is one of a primary circuit and a secondary circuit, and the second circuit is the other one of the primary circuit and the secondary circuit.

14. The method of claim 13, wherein:
- one of the primary circuit and the secondary circuit provides fluid pressure to a brake caliper associated with a front wheel at a driver side of the vehicle, and also to a brake caliper associated with a rear wheel at a passenger side of the vehicle; and
- the other one of the primary circuit and the secondary circuit provides fluid pressure to a brake caliper associated with a front wheel at a passenger side of the vehicle, and also to a brake caliper associated with a rear wheel at a driver side of the vehicle.

15. The method of claim 1, wherein using the sensed stroke of the direct apply component and using the sensed fluid pressure further comprises:
- using a pedal stroke sensor associated with the brake pedal;
- using a first pressure sensor for determining a sensed fluid pressure developed by the direct apply subsystem; and
- using a second pressure sensor for determining a sensed fluid pressure developed by the isolated apply subsystem.

16. A method for detecting the location of and isolating a leak in a braking system for a motor vehicle, the method comprising:
- selectively using a direct apply subsystem, which is operably associated with a brake pedal of the vehicle, and an isolated apply subsystem, to control an application of fluid to a first circuit and to a second circuit of the braking system;
- operating the braking system in a normal mode of operation in which fluid communication of the isolated apply subsystem with the first circuit and the second circuit is enabled, and fluid communication of the direct apply subsystem with the first circuit and the second circuit is blocked;
- using a travel of an isolated apply component of the isolated apply subsystem and a sensed fluid pressure developed by the isolated apply subsystem, in response to a command based on a sensed travel of the direct apply component, to determine if a leak is present in at least one of the first or second circuits;
- upon condition that the sensed fluid pressure developed by the isolated apply subsystem is determined to be greater than or equal to a predetermined value corresponding to the sensed travel of the isolated apply component, then continuing operating in the normal mode;
- upon condition that the sensed fluid pressure developed by the isolated apply subsystem is less than the predetermined value corresponding to the sensed travel of the isolated apply component, determining that a leak is present, and then operating the braking system in a leak location detection mode to detect the location of the leak by:
  - simultaneously controlling the direct apply subsystem and the isolated apply subsystem to:
    - enable fluid communication between the isolated apply subsystem and the first circuit of the braking system;
    - block fluid communication of the direct apply subsystem with the first circuit;
    - enable fluid communication of the direct apply subsystem with the second circuit of the braking system; and
    - block fluid communication of the isolated apply subsystem with the second circuit; and
    - determine if the leak is present in at least one of the first circuit and the second circuit by using a sensed travel of the isolated apply component and a sensed fluid pressure developed by the isolated apply subsystem to determine if the leak is present in the first circuit, and simultaneously using the sensed travel of the direct apply component and a sensed fluid pressure developed by the direct apply subsystem to determine if the leak is present in the second circuit; and
- upon condition of a determination that a leak is present in the first circuit, selectively place the braking system in a first circuit isolation mode, in which the first circuit is isolated, and braking is accomplished exclusively using the second circuit; and
- upon condition of a determination that a leak is present in the second circuit, selectively place the braking system in a second circuit isolation mode, in which the second circuit is isolated, and braking is accomplished exclusively using the first circuit.

17. The method of claim 16, further comprising:
wherein the selectively placing the braking system in the first circuit isolation mode comprises:
- blocking fluid communication of the isolated apply subsystem and the direct apply subsystem with the first circuit of the braking system; and enabling fluid communication of the isolated apply portion and blocking communication of the direct apply subsystem with the second circuit of the braking system.

18. The method of claim 16, further comprising:
wherein the selectively placing the braking system in the second circuit isolation mode comprises:
blocking fluid communication of the isolated apply subsystem and the direct apply subsystem with the second circuit of the braking system; and
enabling fluid communication of the isolated apply subsystem and blocking communication of the direct apply subsystem with the first circuit of the braking system.

19. A system for detecting the location of and isolating a leak in a braking system for a motor vehicle, the system comprising:
a direct apply subsystem operably associated with a brake pedal of the vehicle;
an isolated apply subsystem adapted to control an application of fluid to a first circuit and a second circuit of the braking system;
wherein the isolated and direct apply subsystems are configured to be simultaneously controlled in a leak location detection mode to detect a location of the leak by:
enabling fluid communication between the isolated apply subsystem and the first circuit of the braking system;
blocking fluid communication of the direct apply subsystem with the first circuit;
enabling fluid communication of the direct apply subsystem with the second circuit of the braking system; and
blocking fluid communication of the isolated apply subsystem with the second circuit; and using a sensed travel of an isolated apply component of the isolated apply subsystem and a sensed fluid pressure developed by the isolated apply subsystem to determine if the leak is present in the first circuit, and simultaneously using a sensed travel of a direct apply component associated with the direct apply subsystem, and a sensed fluid pressure developed by the direct apply subsystem, to determine if the leak is present in the second circuit.

20. The system of claim 19, wherein:
the direct apply subsystem also includes a dual output master cylinder mechanically coupled to and actuated by the brake pedal, wherein the brake pedal acts on the direct apply component, and with a first output of the dual output master cylinder in fluid communication with a first master cut valve associated with the first circuit, and a second output of the dual output master cylinder in fluid communication with a second master cut valve associated with the second circuit; and
the isolated apply subsystem includes a single output source comprising one of:
a single output slave cylinder, which is mechanically coupled and actuated using a motor and ball screw assembly; and
a motor driven pump with an accumulator and a spool valve;
wherein the isolated apply subsystem is responsive to a command based on a sensed stroke of the brake pedal, while being mechanically isolated from the brake pedal, to develop fluid pressure by the isolated apply subsystem, with the output of the single output source being in fluid communication with a first apply valve associated with the first circuit and a second apply valve associated with the second circuit.

* * * * *